UNITED STATES PATENT OFFICE.

AUGUST SCHIRER, OF MILWAUKEE, WISCONSIN, ASSIGNOR OF ONE-HALF TO OTTO BRUSS, OF SAME PLACE.

SALVE.

SPECIFICATION forming part of Letters Patent No. 273,613, dated March 6, 1883.

Application filed December 9, 1882. (No specimens.)

*To all whom it may concern:*

Be it known that I, AUGUST SCHIRER, a citizen of the United States, residing at Milwaukee, in the county of Milwaukee and State of Wisconsin, have invented a certain new and useful composition of matter to be used as a salve for medical purposes, of which the following is a specification.

My composition consists of the following ingredients, combined in the proportions stated, viz: aqua fortis, specific gravity 1.36, one pound; oxide of iron, six ounces; spirits of turpentine, one-half gallon; beeswax, two pounds; linseed-oil, two pounds; hog's lard, six pounds; white lead, two ounces. These ingredients are mixed as follows: The oxide of iron is placed in a glass or earthen vessel and the aqua fortis added, and allowed to stand a few hours, or until the oxide of iron is decomposed, thus producing nitrate of iron. The spirits of turpentine, beeswax, linseed-oil, lard, and white lead are also thoroughly mingled together, when the compound formed of the decomposed oxide of iron and aqua fortis is added and thoroughly mixed over a moderate heat, after which the compound is poured into small boxes and allowed to cool, when it is ready for use.

The composition, when cool, forms a salve which has great healing qualities, and is applied to all manner of cuts and bruises, both for man and beast.

I make no claim to the substance known as "nitrate-of-lead ointment" as my invention.

What I claim, and desire to secure by Letters Patent of the United States, is—

The herein-described composition of matter, to be used as a salve for healing purposes, consisting of aqua fortis, oxide of iron, spirits of turpentine, beeswax, linseed-oil, hog's lard, and white lead, in the proportions specified.

In testimony whereof I affix my signature in presence of two witnesses.

AUGUST SCHIRER.

Witnesses:
JAS. B. ERWIN,
OTTO BRUSS.